United States Patent
Oberhofer et al.

(10) Patent No.: US 8,775,226 B2
(45) Date of Patent: Jul. 8, 2014

(54) COMPUTING AND MANAGING CONFLICTING FUNCTIONAL DATA REQUIREMENTS USING ONTOLOGIES

(75) Inventors: Martin A. Oberhofer, Bondorf (DE); Carl Michael Marrelli, Westerville, OH (US); Ram S. Narayanan, Canton, MI (US); Solmaz Rashidi, Las Vegas, NV (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/220,073

(22) Filed: Aug. 29, 2011

(65) Prior Publication Data

US 2013/0054285 A1 Feb. 28, 2013

(51) Int. Cl.
   *G06Q 10/00* (2012.01)
(52) U.S. Cl.
   USPC .................. 705/7.11; 705/7.38; 705/7.41
(58) Field of Classification Search
   CPC ........................................ G06Q 10/00
   USPC ...................... 705/7.11, 7.38, 7.41
   See application file for complete search history.

(56) References Cited

U.S. PATENT DOCUMENTS

| | | | |
|---|---|---|---|
| 6,067,548 A * | 5/2000 | Cheng ................................ 1/1 |
| 6,789,252 B1 | 9/2004 | Burke et al. |
| 2004/0220910 A1* | 11/2004 | Zang et al. .................. 707/3 |
| 2005/0034107 A1* | 2/2005 | Kendall et al. .............. 717/136 |
| 2005/0222895 A1* | 10/2005 | Jakobson et al. ............ 705/10 |
| 2005/0267795 A1 | 12/2005 | Tian et al. |
| 2006/0143611 A1* | 6/2006 | Sadiq ............................ 718/100 |
| 2007/0219826 A1* | 9/2007 | Brodsky et al. .................. 705/2 |
| 2007/0271277 A1* | 11/2007 | Ivan et al. ..................... 707/100 |
| 2009/0192976 A1* | 7/2009 | Spivack et al. ................. 706/55 |
| 2009/0248473 A1* | 10/2009 | Doenig et al. .................... 705/8 |
| 2011/0040703 A1 | 2/2011 | Iqbal |
| 2011/0093792 A1* | 4/2011 | Frayman et al. ............. 715/752 |
| 2011/0161942 A1* | 6/2011 | Brunswig et al. ............ 717/143 |
| 2011/0191273 A1* | 8/2011 | Grabarnik et al. ............. 706/12 |
| 2013/0054285 A1* | 2/2013 | Oberhofer et al. ........... 705/7.11 |

OTHER PUBLICATIONS

An Ontology-Based approach for semantic conflict resolution in database integration—By Liu et al. May 2006.*

(Continued)

*Primary Examiner* — Beth V Boswell
*Assistant Examiner* — Ernest A Jackson
(74) *Attorney, Agent, or Firm* — Holland & Knight LLP; Brian J. Colandreo, Esq.; Jeffrey T. Placker, Esq.

(57) ABSTRACT

In one or more embodiments of the invention, functional data analysts may use a functional data authoring module to capture functional metadata in a consistent manner. Conflict reports for the business processes may be generated for a subset of the business processes or as an overall report across all business processes. One or more embodiments of the invention may provide early detection of data usage and type conflicts from functional data requirements, automated detection of conflicts from functional data requirements, reports listing detected conflicts, conflicts resolution tracking mechanism, ongoing notification regarding changes in functional data requirements or detected conflicts, and avoidance of conflicting functional requirement in the realization phase, thereby reducing costs and project risks and avoiding project delays.

14 Claims, 9 Drawing Sheets

(56) References Cited

OTHER PUBLICATIONS

Ram et al., "Semantic Conflict Resolution Ontology (SCROL): An Ontology for Detecting and Resolving Data and Schema-Level Semantic Conflicts", IEEE Transactions on Knowledge and Data Engineering, vol. 16, No. 2 (2004), pp. 189-202.*

Zhu et al., "Inconsistency Measurement of Software Requirements Specifications: An Ontology-Based Approach", 10th IEEE International Conference on Engineering of Complex Computer Systems (2005), pp. 1-9.

Zhu et al., "Detecting of Requirements Inconsistency: An Ontology-Based Approach", The Fifth International Conference on Computer and Information Technology (2005), pp. 1-7.

Wei-Liang et al., "Anchoring the Consistency Dimension of Data Quality Using Ontology in Data Integration", Sixth Web Information Systems and Applications Conference (2009), pp. 201-205.

Weiler, Gabriele, "Consistency Checking for Workflows with an Ontology Based Data Perspective", (2009), pp. 1-49.

Wen et al., "SLCO and DLCO: Two Ontologies for Detecting and Resolving Schema and Data-Level Semantic Conflicts", Proceedings of the 2009 IEEE International Conference on Information and Automation, pp. 637-642.

Davy et al., "On Harnessing Information Models and Ontologies for Policy Conflict Analysis", IFIP/IEEE International Symposium on Integrated Network Management, (2009), pp. 821-826.

* cited by examiner

| Potential Conflict Report: Finance Domain (not all attributes are shown) | | | | | | | | |
|---|---|---|---|---|---|---|---|---|
| Level 1 Process 250 | Level 2 Process 252 | Level 3 Process 254 | SAP Table | Attribute 610 | Use Mode | Short Description 612 | Long Description 614 | Reconciled Flag 710 | Comments |
| Finance | General Ledger Accounting | Process_ Journal_ Entries | BSEG | ABPER | UPDATE | Settlement Period | ... | TO BE DONE | ... |
| Finance | General Ledger Accounting | Process_ Payroll_ Expenses | BSEG | ABPER | UPDATE | Settlement Period | ... | TO BE DONE | ... |
| Finance | General Ledger Accounting | Accounting for Inventory | BSEG | ABPER | READ ONLY | Settlement Period | ... | TO BE DONE | ... |
| Finance | General Ledger Accounting | Process_ Journal_ Entries | BKPF | AEDAT | UPDATE | Date of the Last Document Change by Transaction | ... | TO BE DONE | ... |
| Finance | General Ledger Accounting | Process_ Payroll_ Expenses | BKPF | AEDAT | UPDATE | Date of the Last Document Change by Transaction | ... | TO BE DONE | ... |
| ... | ... | ... | ... | ... | ... | ... | ... | ... | ... |

COMPUTING AND MANAGING CONFLICTING FUNCTIONAL DATA REQUIREMENTS USING ONTOLOGIES

TECHNICAL FIELD

This disclosure relates to information management, and more particularly, to computing and managing conflicting functional data requirements across business processes using ontologies and text analytics.

BACKGROUND

As businesses continue to grow, they require sophisticated tools to manage various types of information and provide businesses with the ability to capture information, integrate the information with existing systems, and provide access to the information. Some businesses utilize custom-built applications, such as e-commerce platforms or call-centers. Many businesses may use a conglomeration of tools that are created using different programming languages and use a variety of persistencies, such as flat files, hierarchical databases, relational databases, or content management systems. Some applications are information-centric applications such as master data management systems and data warehousing systems. Across all these systems, often the same process may be implemented in a variety of ways, thereby leading to the capture of information in an inconsistent manner. This may lead to data inaccuracies which lead to inefficiencies within or across the systems. In some cases, certain business objects may be utilized across multiple business processes and need a consistent definition across all the business processes. A business object can consist of one or multiple tables. Each table can consist of one or multiple attributes. A business object can be used in one or multiple business processes.

There are generally at least two different phases of a business transformation implementation project, the blueprint phase and realization phase. During the blueprint phase, as the business process teams define the new business processes, a functional data analyst may align their appropriate work stream and capture the functional data requirements for each of the new sub-processes as they are discussed in workshops and follow-up meetings. Each major business process domain may represent an independent work stream. A master data analyst may participate across all business processes that relate to the Create, Read, Update, and Delete processes (CRUD) of their master data objects.

Many conflicts occur during the blueprint phase because the business process teams often work in parallel, but independently from each other. During the blueprint phase, different teams may define functional data requirements differently. A functional data analyst or master data analyst may be the only individual able to detect potential conflicts as a result of cross-process examination of the data definitions. The detection of the potential conflicts is often by chance and is often detected manually by the analyst.

During the realization phase, the specifications defined in the blueprint phase may be implemented. The data team performs the data migration to the new application or new business processes. The functional data requirements captured during the blueprint phase may define how the new data in the new processes relate to each other. Any changes in the requirements during the realization phase may be addressed by the functional/master data analysts.

BRIEF SUMMARY

In a first embodiment, a method may include receiving a request to generate a conflict report for two or more business processes. A business object of one of the two or more business processes is processed to identify at least one attribute associated with the one of the two or more business processes. Existing entries in an ontology for the at least one attribute of the two or more business processes is identified by comparing the at least one attribute to the ontology associated with the two or more business processes. The metadata of the existing entries in the ontology and the at least one attribute is compared to identify a conflicting data requirement between the existing entries and the at least one attribute. The conflict report for the two or more business processes is generated comprising the conflicting data requirement between the existing entries and the at least one attribute.

One or more of the following features may be included. Metadata for the business object may be received from the user via a user interface, wherein the received metadata is associated with the at least one attribute. The business object may be updated to include the metadata from the user. The method may further include generating a notification responsive to the generated conflict report. The notification may be one of an email, a text message, or a pop-up notification.

The method may further include matching the at least one attribute to the ontology using dictionary matching, regular expression matching, fuzzy matching or other types of matching. The dictionary matching may use a dictionary derived from the ontology. The method may further include generating a result list, wherein the result list includes at least a match between the at least one attribute and the ontology. A link column entry may be created for the at least one attribute and the business object in the ontology.

The method may further include using different types of ontologies, such as a static ontology, dynamic ontology, social ontology, and intentional ontology. The method may further include automatically resolving the conflict data requirement between the existing entries and the at least one attribute.

According to another implementation, a computer program product resides on a computer readable storage medium. When executed by a process, a plurality of instructions stored on the computer readable storage medium may cause the processor to perform operations, including: receiving a request to generate a conflict report for two or more business processes, processing a business object of one of the two or more business processes to identify at least one attribute associated with the one of the two or more business processes, identifying existing entries in an ontology for the at least one attribute of the two or more business processes by comparing the at least one attribute to the ontology associated with the two or more business processes, comparing metadata of the existing entries in the ontology and the at least one attribute to identify a conflicting data requirement between the existing entries and the at least one attribute, and generating the conflict report for the two or more business processes comprising the conflicting data requirement between the existing entries and the at least one attribute.

One or more of the following features may be included. Metadata for the business object may be received from a user via a user interface, wherein the received metadata is associated with the at least one attribute. The business object may be updated to include the received metadata from the user. The computer program product may further comprise generating a notification responsive to the generated conflict report. The notification may be an email, a text message, or a pop-up notification.

The computer program product may further comprise matching the at least one attribute to the ontology using one of dictionary matching, regular expression matching and fuzzy matching, wherein dictionary matching uses a dictionary derived from the ontology. The computer program product may further comprise generating a result list, wherein the result list includes at least a match between the at least one attribute and the ontology and creating an entry for the at least one attribute in the ontology. The computer program product may include using different types of ontologies, such as a static ontology, dynamic ontology, social ontology, and intentional ontology. The computer program product may further include automatically resolving the conflict data requirement between the existing entries and the at least one attribute.

According to another implementation, a computing system may include at least one processor and at least on memory architecture coupled with the at least one processor. The computing system may also include the following: a first software module executable by the at least one processor and the at least one memory architecture, wherein the first software module is configured to receive a request to generate a conflict report for two or more business processes; a second software module executable by the at least one processor and the at least one memory architecture, wherein the second software module is configured to process a business object of one of the two or more business processes to identify at least one attribute associated with the one of the two or more business processes; a third software module executable by the at least one processor and the at least one memory architecture, wherein the third software module is configured to identify existing entries in an ontology for the at least one attribute of the two or more business processes by comparing the at least one attribute to the ontology associated with the two or more business processes; a fourth software module executable by the at least one processor and the at least one memory architecture, wherein the fourth software module is configured to compare metadata of the existing entries in the ontology and the at least one attribute to identify a conflicting data requirement between the existing entries and the at least one attribute; and a fifth software module executable by the at least one processor and the at least one memory architecture, wherein the fifth software module is configured to generate the conflict report for the two or more business processes comprising the conflicting data requirement between the existing entries and the at least one attribute.

One or more of the following features may be included. The computing system may include a sixth software module executable by the at least one processor and the at least one memory architecture, wherein the sixth software module is configured to receive metadata for the business object from a user via a user interface, wherein the received metadata is associated with the at least one attribute; and a seventh software module executable by the at least one processor and the at least one memory architecture, wherein the seventh software module is configured to update the business object to include the received metadata from the user.

The computing system may further include an eighth software module executable by the at least one processor and the at least one memory architecture, wherein the eighth software module is configured to generate a notification responsive to the generated conflict report. The notification may be one of an email, a text message, or a pop-up notification. The computing system may include ninth software module executable by the at least one processor and the at least one memory architecture, wherein the ninth software module is configured to match the at least one attribute to the ontology using one of dictionary matching, regular expression matching and fuzzy matching, wherein dictionary matching uses a dictionary derived from the ontology.

The computing system may include a tenth software module executable by the at least one processor and the at least one memory architecture, wherein the tenth software module is configured to generate a result list, wherein the result list includes at least a match between the at least one attribute and the ontology; and an eleventh software module executable by the at least one processor and the at least one memory architecture, wherein the eleventh software module is configured to create a link column entry for the at least one attribute and the business object in the ontology.

The computing system may include using different types of ontologies, such as a static ontology, dynamic ontology, social ontology, and intentional ontology. The computing system may include a twelfth software module executable by the at least one processor and the at least one memory architecture, wherein the twelfth software module is configured to automatically resolve the conflicting data requirement between the existing entries and the at least one attribute.

According to another implementation, a method may include receiving a request to generate a conflict report for two or more business processes; processing a business object of one of the two or more business processes to identify at least one attribute associated with the one of the two or more business processes; identifying existing entries for the at least one attribute of the two or more business processes by comparing the at least one attribute to an ontology associated with the two or more business processes; creating a new entry for the at least one attribute of the two or more business processes and storing the new entry to the ontology; comparing metadata of the existing entries in the ontology and the at least one attribute to identify a conflicting data requirement between the existing entries and the at least one attribute; and generating the conflict report for the two or more business processes comprising the conflicting data requirement between the existing entries and the at least one attribute.

The details of one or more implementations are set forth in the accompanying drawings and the description below. Other features and advantages will become apparent from the description, the drawings, and the claims.

BRIEF DESCRIPTION OF THE SEVERAL VIEWS OF THE DRAWINGS

FIG. 6 is a diagrammatic view of an example of a table field list;

FIG. 8 is a diagrammatic view of an example of an input data used by the conflict report process utilizing an ontology of FIG. 1.

In the drawings, like reference numbers generally indicate identical, functional similar, and/or structurally similar elements.

DETAILED DESCRIPTION

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
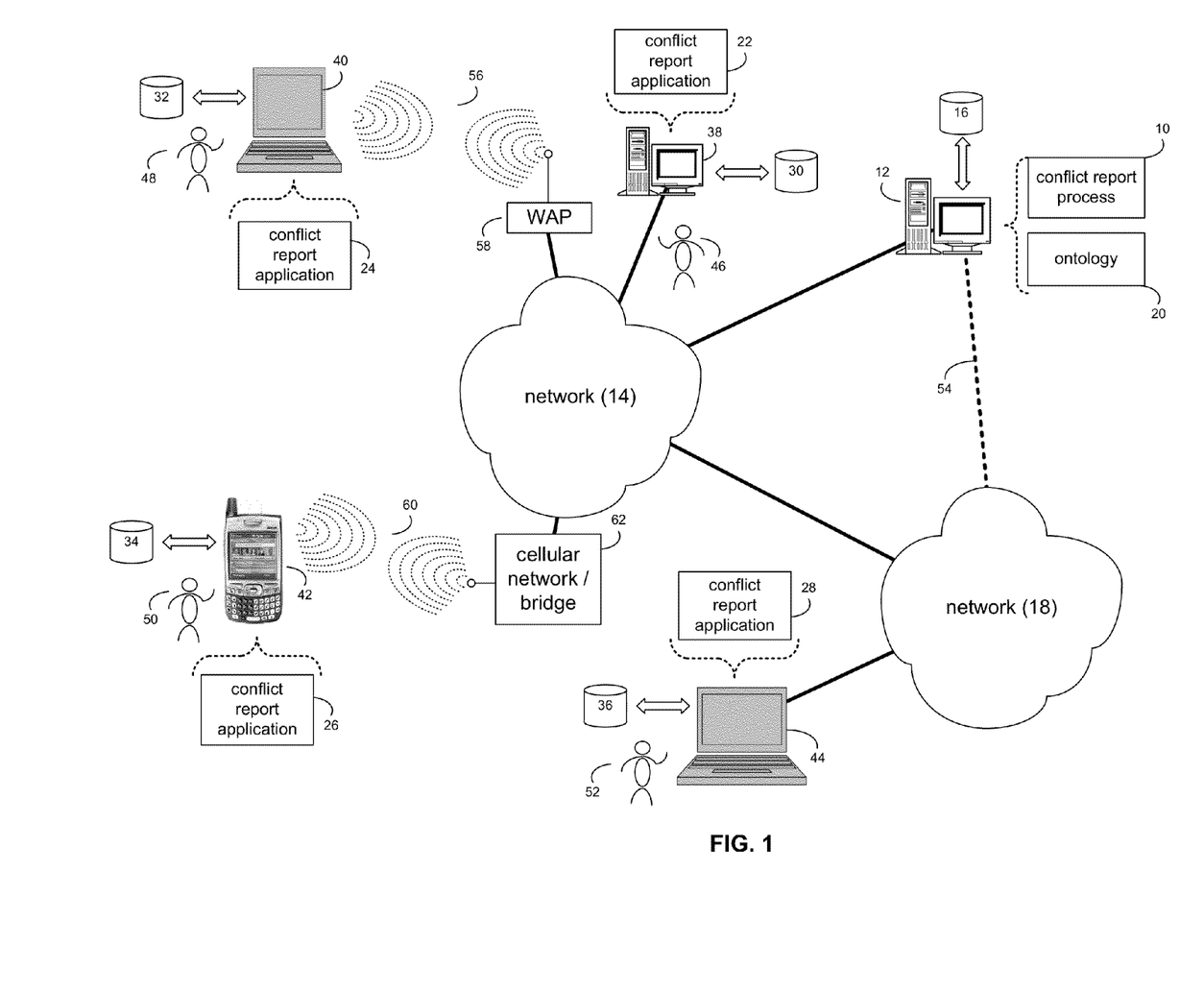
FIG. 1 is a diagrammatic view of a conflict report process utilizing an ontology coupled to a distributed computing network.

Referring to FIG. 1, there is shown conflict report process 10 that may reside on and may be executed by server computer 12, which may be connected to network 14 (e.g., the Internet or a local area network). In the example below, a single ontology and a single server computer are depicted. However, the system may include different ontologies, which may be of different types (i.e. static, dynamic, intentional, or social) which may reside on and be executed by more than one server computer. Ontology 20 may also reside on and may be executed by server computer 12. Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, the conflict report process may reside on and be executed, in whole or in part, by a client electronic device, such as a personal computer, notebook computer, personal digital assistant, or the like.

Figure 2:
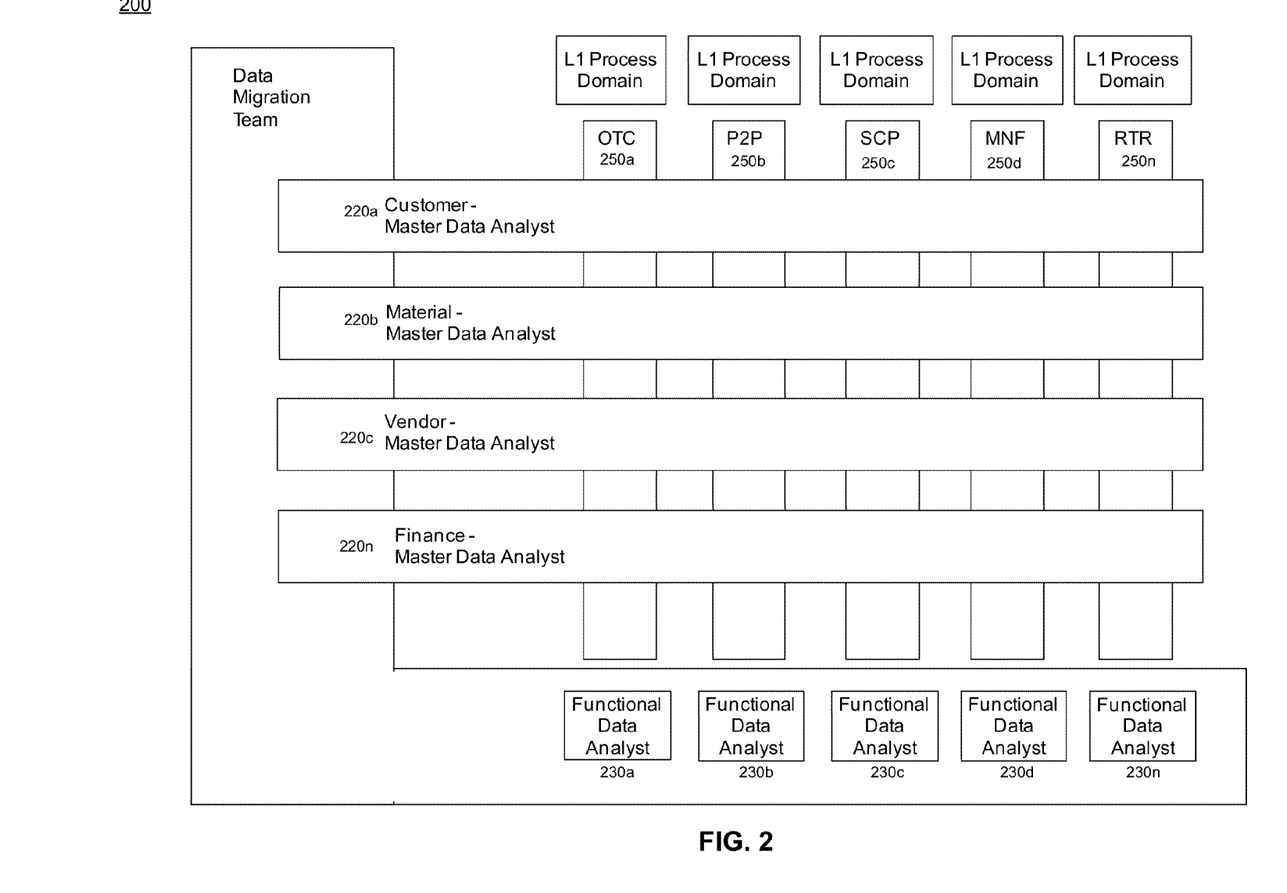
FIG. 2 is a diagrammatic view of an example for a data team structure for a data migration project.

As will be discussed below in greater detail, conflict report process 10 may receive a request to generate a conflict report for two or more business processes. A business process may include a collection of related, structured activities or tasks that produce a specific service or product for a particular customer or customers. Examples of business processes may include, but are not limited to: Order-to-Cash (OTC) 250*a*, Procurement-to-Pay (P2P) 250*b*, Supply Chain Processing (SCP) 250*c*, Record to Report (RTR) 250*n* and Manufacturing (MNF) 250d, as depicted in FIG. 2. An End-to-End order process may cover the point of a potential order creation all the way to order fulfillment. Some business processes may only include one process and the conflicts identified would be on a sub-process level, whereas other business processes may include multiple processes (i.e. multiple Level 1 Processes 250 depicted in FIG. 5 and described in depth later).

Conflict report process 10 may process a business object of one of the two or more business processes to identify at least one attribute associated with one of the two or more business processes. Conflict report process 10 may identify possible conflicts for the attribute of the two or more business processes by comparing the attribute to ontology 20 associated with the two or more business processes. Conflict report process 10 may compare metadata in the ontology 20 and the attribute to identify a potential conflicting data requirement. The conflict report process 10 may generate a conflict report for the two or more business processes comprising the conflicting data requirement.

The instruction sets and subroutines of conflict report process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM).

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Conflict report process 10 may be a stand alone application or it might be deployed as a web application on the previously mentioned web server, or may be an applet/application component/script that may interact with and/or be executed in conjunction with ontology 20. In addition/as an alternative to being a server-side process, the conflict report process 10 may be a client-side process (not shown) that may reside on a client electronic device (described below) and may interact with a business process application. Further, the conflict report process may be a hybrid server-side/client-side process that may interact with conflict report application (e.g., one or more of conflict report applications 22, 24, 26, 28). As such, the conflict report process may reside, in whole, or in part, on server computer 12 and/or one or more client electronic devices.

The instruction sets and subroutines of conflict report applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). The conflict report applications 22, 24, 26, 28 may be used by users 46, 48, 50, 52 to access conflict report process 10 and initiate generation of a conflict report. Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using conflict report applications 22, 24, 26, 28, users 46, 48, 50, 52 may access conflict report process 10.

Users 46, 48, 50, 52 may access conflict report process 10 directly through the device on which the conflict report application (e.g., 22, 24, 26, 28) is executed, namely client electronic devices 38, 40, 42, 44, for example. Users 46, 48, 50, 52 may access conflict report process 10 directly through network 14 or through secondary network 18. Further, server computer 12 (i.e., the computer that executes conflict report process 10) may be connected to network 14 through secondary network 18, as illustrated with phantom link line 54.

In addition to conflict report process 10, server computer 12 may execute various additional applications, e.g., business process application (not shown) (the instruction sets and subroutines of which may reside on storage device 16). While the various additional applications are shown as being executed on server computer 12, it should be appreciated that one or more of the additional applications may be executed on one or more separate devices, systems, and/or networks. Further, while a single additional application has been illustrated, this is for clarity of description, and should not be construed as a limitation as multiple additional applications may be implemented.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (i.e., WAP) 68, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Mobile computing device 42 is shown wirelessly coupled to network 14 via wireless communication channel 60 established between mobile computing device 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both.)

For the purpose of the following description, conflict report application 22 may be discussed. However, this is for illustrative purposes only and should not be construed as a limitation of the present disclosure, as other conflict report applications (e.g., application 24, 26, 28) may be equally utilized.

Now referring to FIG. 2 a diagrammatic view of an example for a data team structure for a data migration project is depicted. A business may utilize multiple business processes 250a-250n (collectively referred to as 250). A complex system involving multiple business processes may involve many different types of positions, such as master data analysts 220a-220n (collectively referred to as 220) and functional data analysts 230a-230n (collectively referred to as 230). A master data analyst 220 may specialize in a type of data associated with multiple business processes 250a-250n, whereas a functional data analyst 230 may specialize within a single business process 250a. A common issue that master data analysts 220 and functional data analysts 230 may face is the inability to proactively identify conflicting data requirements across business processes 250a-250n or within different sub-processes easily and quickly.

In some data team structures, functional data analysts 230 work in conjunction with a process team and specialize in the data requirements within a business process 250. Master data analysts 220 may specialize in a master data object, such as Customer, Vendor, Product or Finance and may work across several business processes 250a-250n since master data objects may be shared across multiple business processes. Master data analysts may be responsible for the data requirements relating to the CRUD (Create, Read, Update, Delete) processes of their data object across the multiple business processes.

Figure 3:
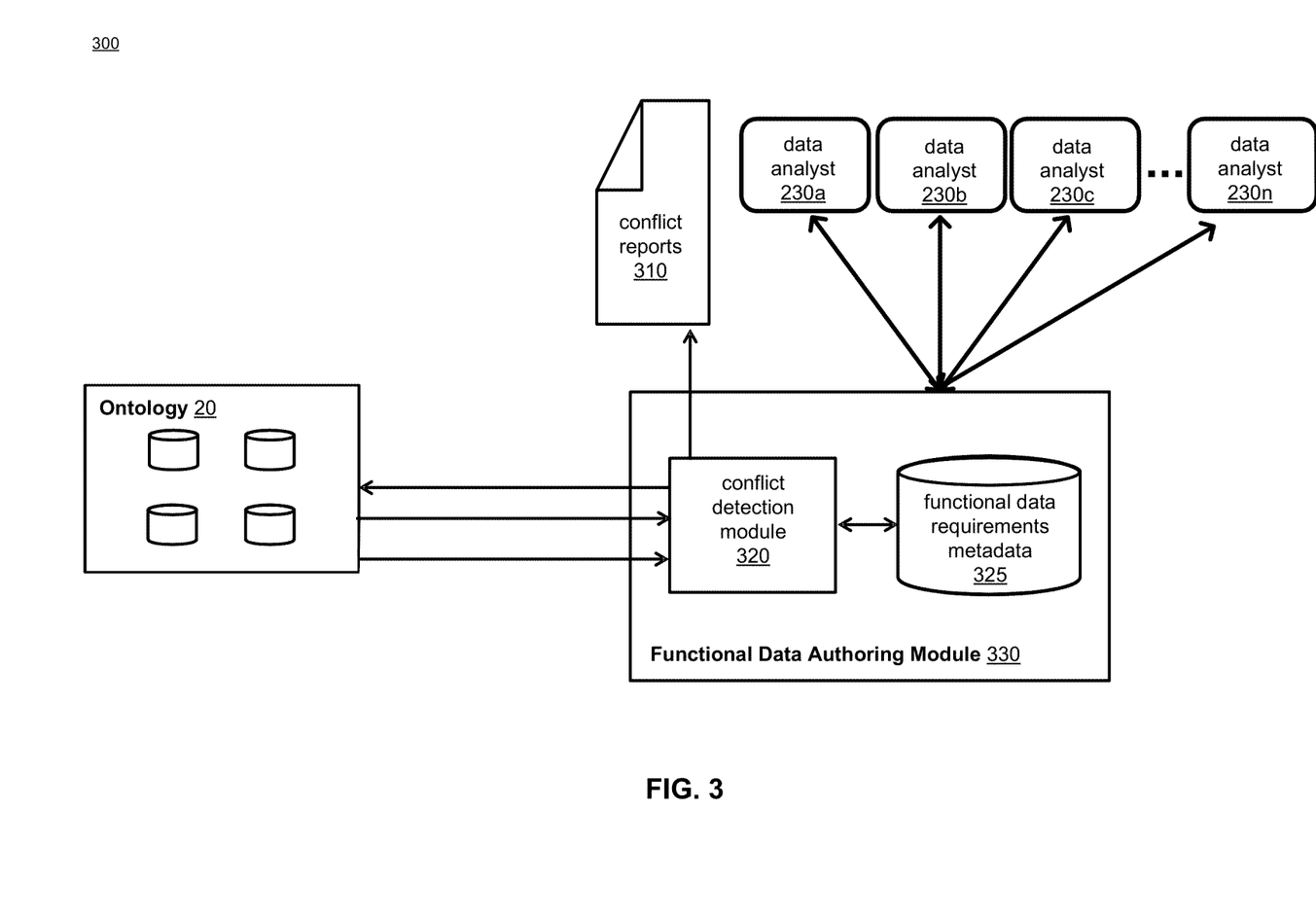
FIG. 3 is a diagrammatic view of an example of a system architecture of a conflict report process utilizing an ontology of FIG. 1.

Now referring to FIG. 3 a diagrammatic view of an example of a system architecture of a conflict report process utilizing an ontology of FIG. 1 is depicted. In brief overview, the system may comprise a functional data authoring module 330. The functional data authoring module 330 may include a functional data requirements metadata database 325 and a conflict detection module 320. The conflict detection module 320 may communicate with one or more ontologies 20. Responsive to the communication with ontology 20, the conflict detection module 320 may generate a conflict report 310. The generated conflict report 310 may be distributed to data analysts 220, 230.

Still referring to FIG. 3, and in more detail, the functional data authoring module 330 may include a functional data requirements metadata database 325 and a conflict detection module 320. The functional data requirements metadata database 325 may store all the metadata captured by the master/functional data analysts 220, 230. In some embodiments, the metadata may be captured through a web interface. In other embodiments, the metadata may be captured through another user interface technology. The user interface allows the master/functional data analysts 220, 230 to capture and change functional data requirements during the blueprinting process. The metadata that may be captured through the interface and stored in the functional data requirements metadata database may include such metadata as field names, field data types, field constraints, schema and table field relations, business objects the table and field belong to, with metadata providing classification/domain information (which may be used to search for a linkage into the ontology 20), business metadata describing the functional use of the field (which may be used to search for a linkage into the ontology 20) and metadata linking the business object to one or multiple business processes 250, wherein the business processes themselves may be structured in a multi-level business process hierarchy (which may be used to search for a linkage into the ontology). The metadata may also include the primary owner of the business object, read or read-write access of the business object by owner, tables and attributes associated by the business object and references to other business object. The tables storing the metadata captured by the master/functional data analysts 220, 230 may be used to generate a business object associated with a business process 250.

The conflict detection module 320 may detect conflicts in the functional data requirements database 325. The conflict detection module 320 may be invoked explicitly by a master/functional data analysts 220, 230 or it may be triggered if one or multiple the ontologies 20 change.

The ontology 20 may be a single ontology or multiple physically separated ontologies covering different ontology types. There are different types of ontologies such as: static, dynamic, social and intentional. A static ontology may describe static aspects of the world (i.e., what things exist, their attributes and relationships). An example of a static ontology may be an entity such as a product with the attributes describing it. A dynamic ontology describes the changing aspects of the world in terms of states, state transitions and processes. An example of a dynamic ontology may be an order which has life cycle aspects such as order creation, order shipment, and order billing. A social ontology may cover social settings, such as agents, positions, roles, authority, permanent organizational structures or shifting networks of alliances and interdependencies. Examples of a social ontology may be the concept of a legal hierarchy or roles for employees such as developer and sales person. An intentional ontology may encompass the world of things agents believe, want, prove or disprove.

Figure 4A:
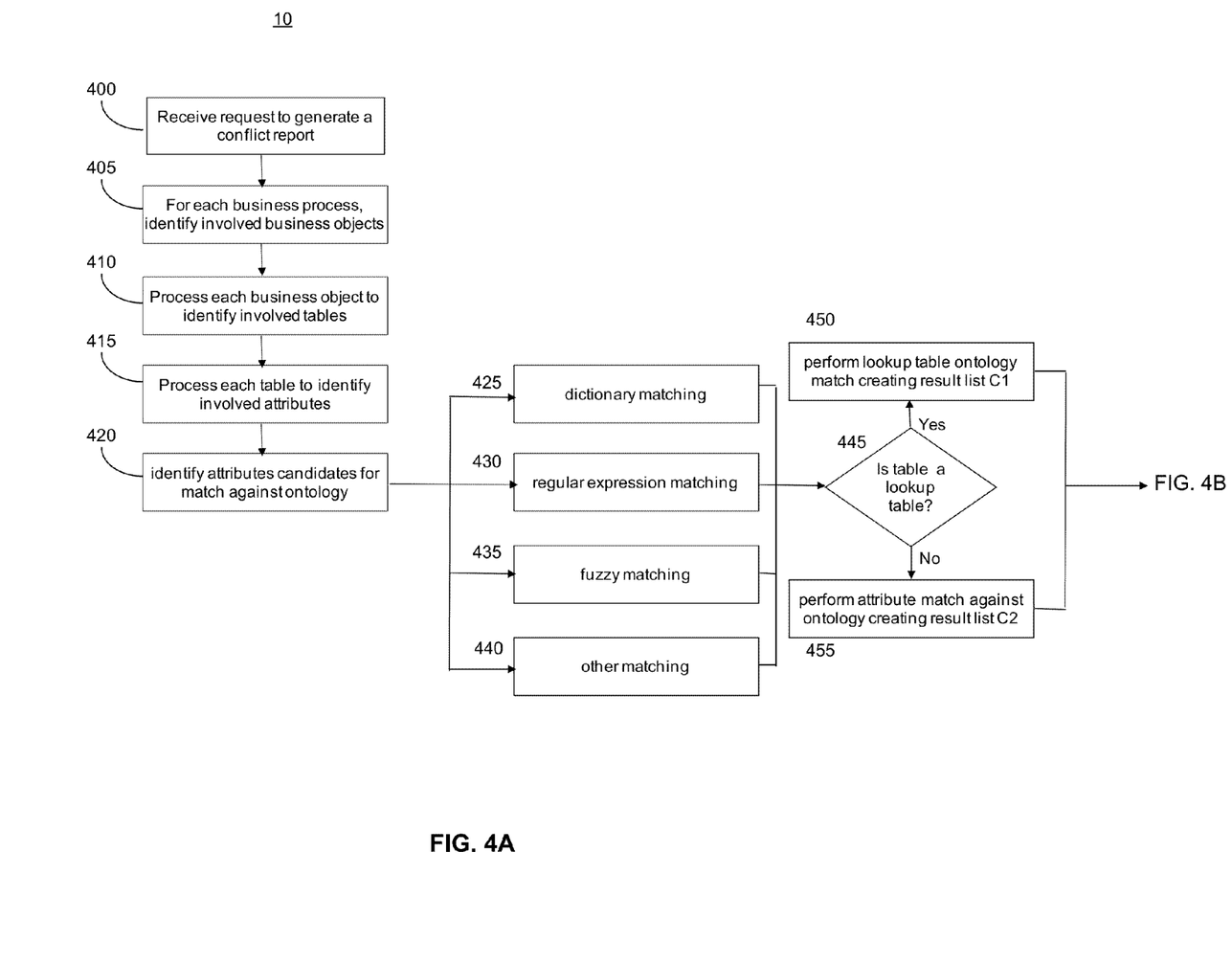
FIGS. 4A and 4B are flowcharts of the conflict report process utilizing an ontology of FIG. 1.

Now referring to FIG. 4, a flow diagram for conflict report process 10 is depicted. In brief overview, a request to generate a conflict report for two or more business processes may be received 400. The conflict report process 10 may identify the involved business objects for the two or more business processes 405. A business object may be processed to identify the involved tables for a business process 410. The involved tables may be processed to identify attributes associated with one of the two or more business processes 415. The conflict report process 10 may identify attribute that are candidates for matching against the ontology 420. The candidate attributes may be matched to the ontology 20 using dictionary matching 425, regular expression matching 430, fuzzy matching 435, or any other type of matching 440. Metadata in the ontology 20 and the metadata of the attribute may be compared to identify a conflicting data requirement. The conflict report process 10 may perform a lookup table ontology match to create result list C1 450. The conflict report process 10 may perform attribute match against ontology 20 creating result list C2 455.

A request to generate a conflict report 310 for two or more business processes 250 may be received 400. In some embodiments, the request to generate the conflict report 310 may arise from a functional 230 data analyst or master data analyst 220 that may explicitly trigger the creation of a conflict report 310 either across all business processes 250a-250n or a subset of the business processes. In some embodiments, the request to generate 400 a conflict report 310 may be triggered by a change in ontology 20. In some embodiments, the request to generate 400 the conflict report 310 may be received from a conflict report application (i.e. 22, 24, 26, 28).

Conflict report process 10 may identify 405 one or more business objects associated with the one or more business processes to be used to generate a conflict report 310. The one or more business objects may be processed to identify involved tables 410. The one or more involved tables identified by 410 may be processed to identify involved attributes 415 associated with one of the two or more business processes

250. For each of the selected business processes, the functional data authoring module 330 may determine the involved business objects 405. In some embodiments, the conflict report process 10 identifies the business objects associated with a business process. For each of the identified 405 business objects, the functional data authoring module 330 may identify tables 410 associated/within each of the data objects. For each of the identified 410 tables, either associated with or within each of the business objects, the functional data authoring module 330 may parse the table and identify 415 fields or attributes of the table which will be compared to ontology 20. The conflict report process 10 may identify candidate attributes for matching against the ontology 420. In some embodiments, the candidates are identified using criteria received from a user. In some embodiments, the candidates are identified using criteria from a previous conflict report generation. In some embodiments, the candidate attributes are stored in a table. In some embodiments, the table is a look-up table.

Candidate attributes may be compared with ontology 20 using dictionary matching 425, regular expression matching 430, fuzzy matching 435, or other matching 440. Dictionary matching may involve matching the identified attribute and related metadata to an entry of a dictionary. In some embodiments, the dictionary matching 425 may use a dictionary derived from ontology 20. Regular expression matching may involve matching, using regular expression, the identified attribute and related metadata either directly to the ontology or information derived from the ontology. In some embodiments, fuzzy matching 435, as is well-known in the art, may involve approximate string matching rather than exact string matching. Fuzzy string matching is a technique of finding strings that approximately match a given pattern, rather than searching for exact matches. Any combination of dictionary matching 425, regular expression matching 430, fuzzy matching 435, and other types of matching 440 or string searching may be used on the attribute and/or metadata and the ontology 20 to identify possible conflicts. Potential conflicts may be identified by comparing the attribute or field to ontology 20 associated with the two or more business processes 250 using any of the matching processes described herein. The identified attributes or fields may be directly compared to the ontology 20.

The conflict report process 10 may determine whether the table storing the candidate attributes is a look-up table 445. If the table is a lookup table, then the conflict report process 10 performs matching on the lookup table and ontology 450, generating a result list Cl. If the table storing the candidate attributes is not a look up table 455, then the conflict report process 10 performs matching of the attribute against the ontology 20 and generates result list C2.

Figure 4B:
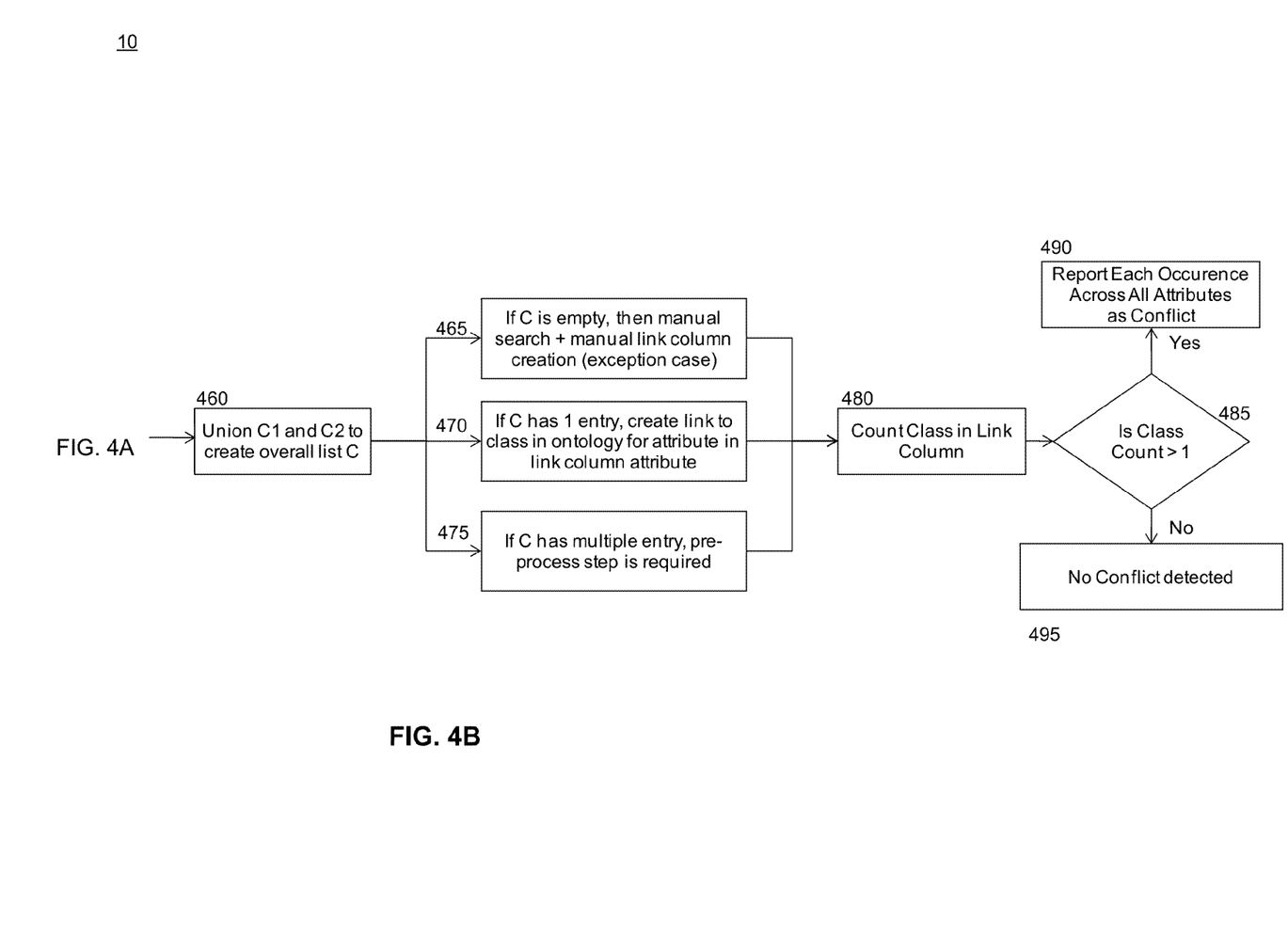

Now referring to FIG. 4B, the conflict report process 10 may perform a union of C1 and C2 to create overall list C 460. If the list C is empty 465, then a manual search and manual link column creation is performed. If C has one entry 470, then a link to ontology 20 for the attribute is created and stored to the link column. If C has more than one entry 475, then a pre-processing step may be required. In some embodiments, the pre-processing step may include additional analysis of the matches between the attribute and related metadata to the ontology to determine if any of the identified entries are duplicative. A count class make be invoked on the link column to determine the number of entries in C 480. The conflict report process 10 may determine whether the class count is greater than one 485. If the class count is greater than one 490, then a conflict report 310 may be generated, reporting each occurrence across all business processes as a potential conflict. If the class count is less than or equal to one, then no conflict is detected 495. In some embodiments, a notification is generated to inform the user that no conflicts were detected. The notification may be in the form of an email, text message, pop-up notification or other form of notification available on the computing system.

In another embodiment, comparisons between the attribute and the ontology 20 may generate a list of potential candidates in the ontology 20 and a link is not stored in the ontology 20 until an explicit request is received from a functional data analyst 230 or a master data analyst 220.

The result of the matching between the attribute and related metadata to the ontology may be transmitted back to the conflict detection module 320 and used to generate a conflict report 310. In cases where a match is found between an identified attribute and the ontology, a link for the attribute may be saved in ontology 20. If the attribute does not exist in ontology 20, a link may be created for the attribute and stored to the ontology 20.

Metadata in the ontology 20 and the metadata related to an attribute may be compared to identify a conflicting data requirement. For example, a table, as depicted in FIG. 6, may be used to compare the identified attributes or fields to ontology 20. In some embodiments, the free form text in the description field 612, 614 may be parsed using a text mining algorithm or UIMA-based analytics with dictionaries, regular expressions, or similar mechanisms to identify key words or text which may be useful for comparing to ontology 20. In some embodiments, attributes or fields may be compared to a dictionary derived from ontology 20.

Once the identified attribute is compared to the ontology 20 to which a link has been established, the attribute is checked to determine if more than one field is linked in the ontology 20. If a single field is linked in the ontology 20, no further action is taken. If two or more fields are linked to the ontology 20, it is likely the attribute is semantically the same based on the analyzed business metadata. In some cases, the technical metadata, such as field names, data types, and field constraints, may be the same for all fields of the attribute and the existing entry in the ontology 20, indicating that no conflict exists. A potential conflict may be identified when the business metadata indicates the same meaning between the attribute and the existing entry in the ontology 20 but the representation is different and may thus require resolution. Such instances are flagged and used to generate 408 a conflict report 310 to be transmitted to one or more functional data analysts 230 or master data analysts 220.

The conflict report 310 may be generated for the two or more business processes, including the conflicting data requirement between the existing entry of the ontology 20 and the attribute. A notification may be generated responsive to the generation of the conflict report 310. In some embodiments, the notification may be in the form of an email, a pop-up notification, or an SMS. The notification may be sent to the master/functional data analyst 220, 230 who initiated the conflict report. In some embodiments, the notification may be sent to all master/functional data analysts 220, 230 affected by the contents of the conflict report 310. In still other embodiments, the notification may be sent to a pre-determined list of recipients responsive to the generation of the conflict report 310.

In some embodiments, conflicting data requirements may be automatically resolved between the existing entry in the ontology 20 and the identified attribute. For example, Business Process A may include an attribute for a customer address with a definition that the field permits fifty (50) characters in the field and Business Process B may include an attribute for a customer address with a definition that the field permits seventy (70) characters in the field. Once the linking is established to the ontology 20 indicating a possible conflict related to the customer business object used in Business Process A and Business Process B. The system may determine to update Business Process A to permit seventy (70) characters in the field and update the ontology 20 to reflect the change.

Figure 5:
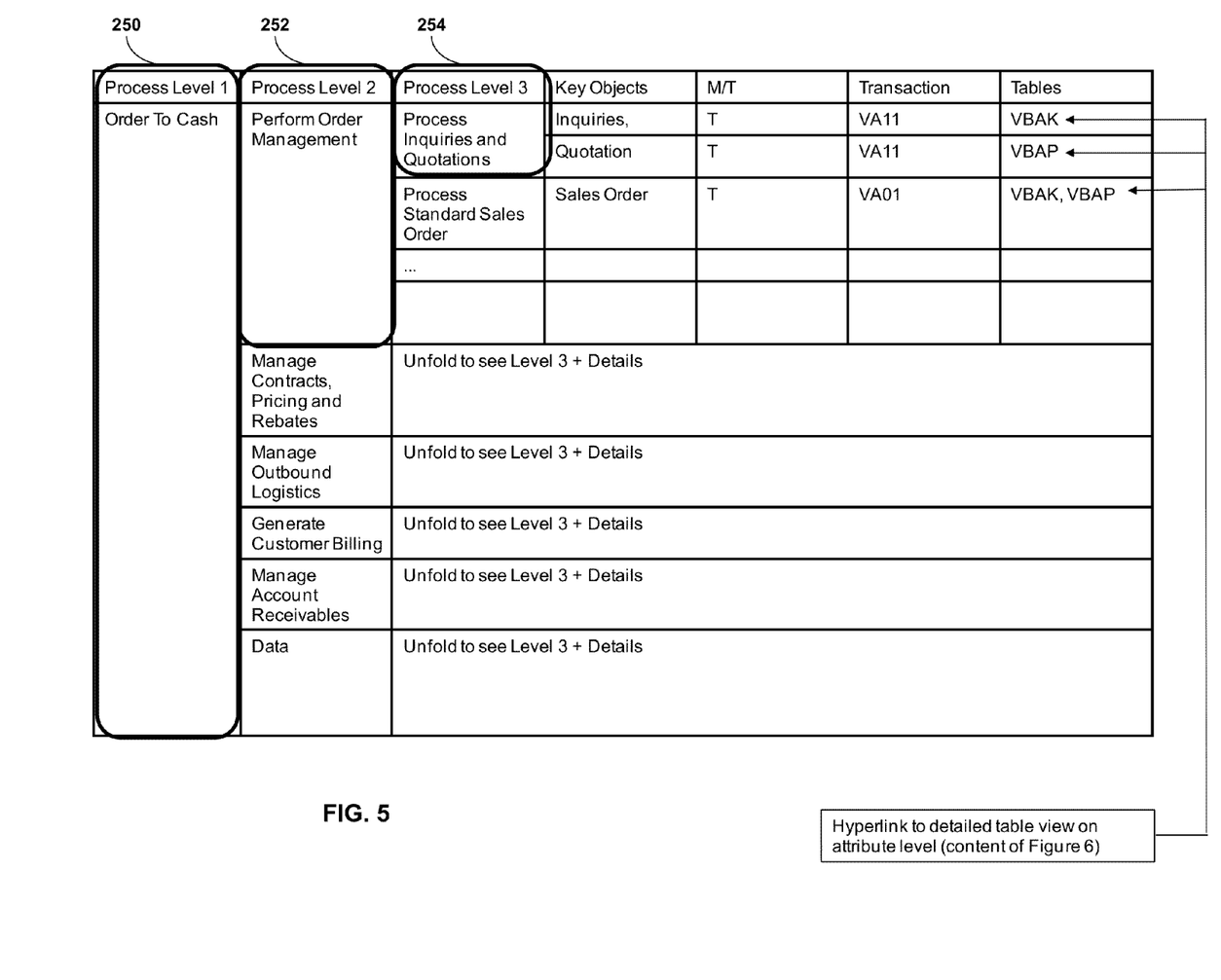
FIG. 5 is a diagrammatic view of an example of a breakdown of a business process.

Now referring to FIG. 5, a diagrammatic view of an example of a breakdown of a business process 250 is depicted. A major business process, such as Order-To-Cash (OTC) may be divided into many sub-processes 252, which may in turn be further divided into sub-processes 254. This may lead to a multi-layered process tree with many granular processes for a major business process area. The multiple layers and increasing complexity may often lead to different applications for different sub-processes 252, 254 within a business process 250 which may utilize different data models, such as logical table structures. Such complexity may easily lead to conflicting attributes that would affect the integrity of the data captured in these systems. Using the functional data requirements metadata database 325, capturing the functional data requirements across these processes allows the system to identify conflicting functional data requirements and thus reduce the number of inconsistencies in the data captured by these systems.

Now referring to FIG. 6, a diagrammatic view of an example table field list 600 is depicted. The table field list 600 for all attributes of a table is stored alongside the information shown on the process hierarchies shown in FIG. 5 in the functional data requirements metadata database. The table field list 600 can be visualized through a spreadsheet using ODBC interface of the database using SQL statements to inquiry it from the functional data requirements metadata database or through a Web UI submitting the SQL queries through JDBC interface of the database. The table field list 600 may take any form wherein the data can be easily sorted and organized. The table field list 600 displays the attribute and metadata captured by the master/functional data analysts 220, 230 using a user interface. The attribute 610 and associated metadata 612, 614 may be defined during the blueprinting process and may evolve through continued use of the system.

Figure 7:
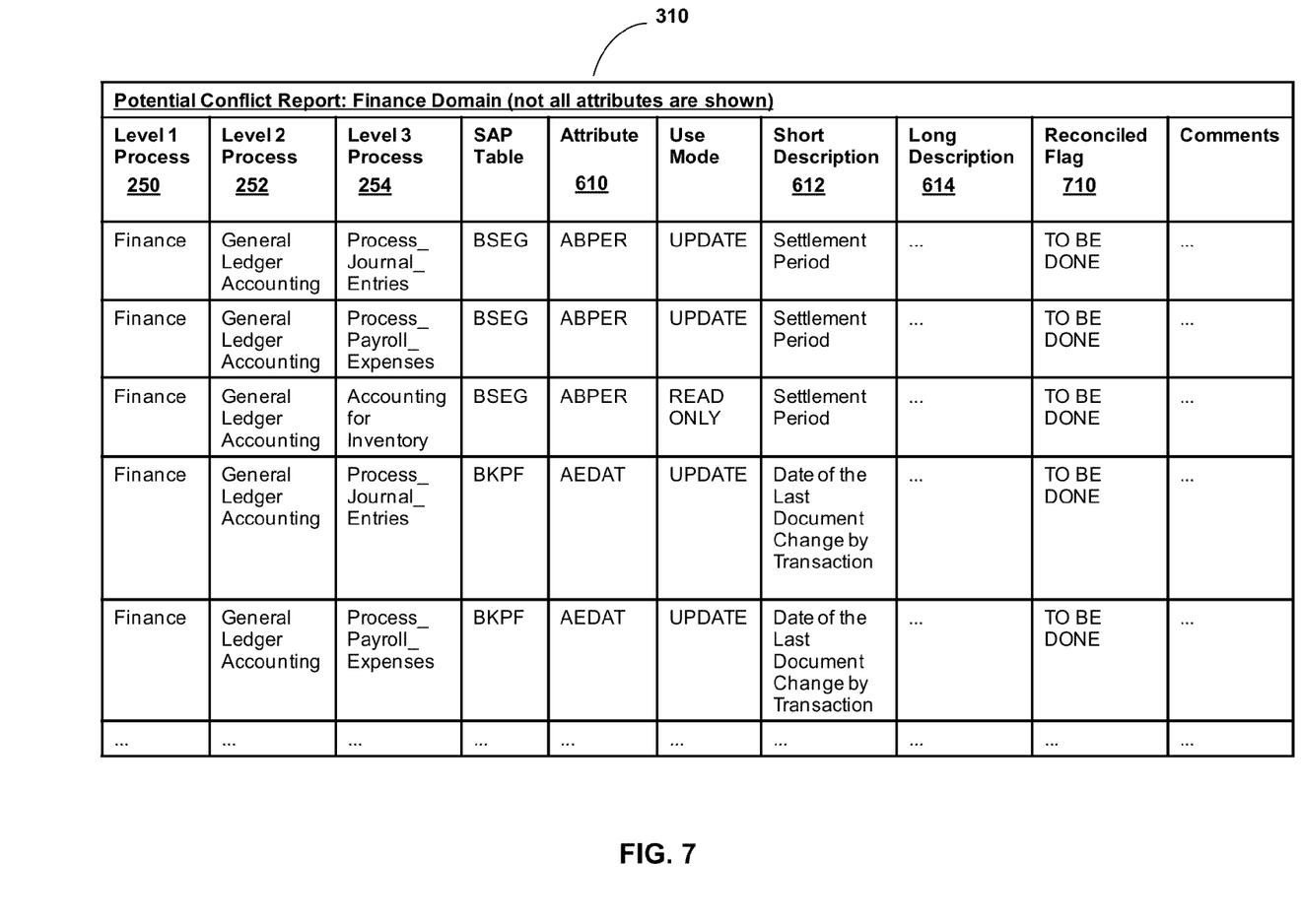
FIG. 7 is a diagrammatic view of an example of a conflict report generated by the conflict report process utilizing an ontology of FIG. 1.

Now referring to FIG. 7, a diagrammatic view of an example of a conflict report 310 generated 408 by the conflict report process 10 utilizing one or multiple ontologies 20 of FIG. 1 is depicted. As shown, the conflict report 310 may be in the form of a spreadsheet, although the conflict report generated may take any form wherein the data can be easily sorted and organized. A conflict report 310 may include the business processes 250 associated with any identified attributes 610. Depending on the complexity of the business processes, sub-processes 252, 254 may also be listed. In some conflict reports 310, in addition to the associated business processes 250, the metadata associated with the attribute 610, such as a short description 612 and a long description 614 may also be included in the report. By including the metadata associated with the attribute 610, a master/functional data analyst 220, 230 may easily review the potential conflict without having to manually access each attribute in the various business processes 250. In some embodiments, a reconcile flag 710 may also be included in the generated 408 conflict report 310 to enable tracking of resolutions to the identified potential conflicts.

Now referring to FIG. 8, a diagrammatic view of an example of an input data table used by the conflict report process 10 utilizing ontology 20 of FIG. 1. As shown, the input data table generated from the functional data requirements metadata database 325 contains metadata, such as the business process 250, sub-processes 252 of the business process, and sub-processes of the sub-processes 254. Additionally, the table may include the name of an attribute 610, a short description 612 of the attribute 610 and a long description 614 of the attribute 610. The metadata captured in the input data table may be used to compare an attribute 610 to ontology 20 to identify possible conflicts. For example, the table of FIG. 8 may include a column storing a link to the class in the ontology 20. A count operation may be performed to determine the number of times the class appears in the ontology 20. If the class is linked to more than one occurrence of the same attribute, the values in the columns data type, length, key, and description may be compared among the multiple occurrences. Any mismatch may indicate a conflict which would be included in the conflict report 310 generated. In some embodiments of the system, the functional data authoring module 330 may generate an input data table and compare identified attributes 610 from a business object to the table. Once the comparison is complete, the functional data authoring module may compare the result of the comparison to the ontology 20.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A computer program product residing on a non-transitory computer readable storage medium having a plurality of instructions stored thereon, which, when executed by a processor, cause the processor to perform operations comprising:
receiving a request to generate a conflict report for two or more business processes;
processing a business object of one of the two or more business processes to identify at least one table;
parsing the at least one table to identify at least one attribute associated with the one of the two or more business processes;
identifying existing entries in an ontology for the at least one attribute of the two or more business processes by comparing the at least one attribute to the ontology associated with the two or more business processes;
comparing metadata of the existing entries in the ontology and the at least one attribute to identify a conflicting data requirement between the existing entries and the at least one attribute, wherein a potential conflict is identified when the metadata between the existing entries in the ontology and the at least one attribute includes a same meaning and the data requirement between the existing entries and the at least one attribute is different, wherein a link is created between the existing entries and the at least one attribute based on, at least in part, the identified potential conflict;
generating the conflict report for the two or more business processes comprising the conflicting data requirement between the existing entries and the at least one attribute; and
automatically resolving the conflicting data requirement between the existing entries and the at least one attribute.

2. The computer program product of claim 1, further comprising:
receiving metadata for the business object from a user via a user interface, wherein the received metadata is associated with the at least one attribute; and
updating the business object to include the received metadata from the user.

3. The computer program product of claim 1, further comprising generating a notification responsive to the generated conflict report.

4. The computer program product of claim 3, wherein the notification may be one of an email, a text message, and a pop-up notification.

5. The computer program product of claim 1, further comprising matching the at least one attribute to the ontology using one of dictionary matching, regular expression matching and fuzzy matching, wherein dictionary matching uses a dictionary derived from the ontology.

6. The computer program product of claim 5, further comprising:
generating a result list, wherein the result list does not include at least a match between the at least one attribute and the ontology; and
creating a link column entry for the at least one attribute and the business object in the ontology.

7. The computer program product of claim 1, wherein the ontology includes one or more of a static ontology, dynamic ontology, social ontology, and intentional ontology.

8. A computing system comprising:
at least one processor;
at least one memory architecture coupled with the at least one processor;
a first software module executable by the at least one processor and the at least one memory architecture, wherein the first software module is configured to receive a request to generate a conflict report for two or more business processes;
a second software module executable by the at least one processor and the at least one memory architecture, wherein the second software module is configured to process a business object of one of the two or more business processes to identify at least one table;
a third software module executable by the at least one processor and the at least one memory architecture, wherein the third software module is configured to parse the at least one table to identify at least one attribute associated with the one of the two or more business processes;
a fourth software module executable by the at least one processor and the at least one memory architecture, wherein the fourth software module is configured to identify existing entries in an ontology for the at least one attribute of the two or more business processes by comparing the at least one attribute to the ontology associated with the two or more business processes;
a fifth software module executable by the at least one processor and the at least one memory architecture, wherein the fifth software module is configured to compare metadata of the existing entries in the ontology and the at least one attribute to identify a conflicting data requirement between the existing entries and the at least one attribute, wherein a potential conflict is identified when the metadata between the existing entries in the ontology and the at least one attribute includes a same meaning and the data requirement between the existing entries and the at least one attribute is different, wherein a link is created between the existing entries and the at least one attribute based on, at least in part, the identified potential conflict;
a sixth software module executable by the at least one processor and the at least one memory architecture, wherein the sixth software module is configured to generate the conflict report for the two or more business processes comprising the conflicting data requirement between the existing entries and the at least one attribute; and
a seventh software module executable by the at least one processor and the at least one memory architecture, wherein the seventh software module is configured to automatically resolve the conflicting data requirement between the existing entries and the at least one attribute.

9. The computing system of 8, further comprising:
a eighth software module executable by the at least one processor and the at least one memory architecture, wherein the eighth software module is configured to receive metadata for the business object from a user via a user interface, wherein the received metadata is associated with the at least one attribute; and
a ninth software module executable by the at least one processor and the at least one memory architecture, wherein the ninth software module is configured to update the business object to include the received metadata from the user.

10. The computing system of claim 8, further comprising an tenth software module executable by the at least one processor and the at least one memory architecture, wherein the tenth software module is configured to generate a notification responsive to the generated conflict report.

11. The computing system of claim 10, wherein the notification may be one of an email, a text message, and a pop-up notification.

12. The computing system of claim 8, further comprising a eleventh software module executable by the at least one processor and the at least one memory architecture, wherein the eleventh software module is configured to match the at least one attribute to the ontology using one of dictionary matching, regular expression matching and fuzzy matching, wherein dictionary matching uses a dictionary derived from the ontology.

13. The computing system of claim 12, further comprising:

a twelfth software module executable by the at least one processor and the at least one memory architecture, wherein the twelfth software module is configured to generate a result list, wherein the result list does not include at least a match between the at least one attribute and the ontology; and an thirteenth software module executable by the at least one processor and the at least one memory architecture, wherein the thirteenth software module is configured to create a link column entry for the at least one attribute and the business object in the ontology.

14. The computing system of claim 8, wherein the ontology includes one or more of a static ontology, dynamic ontology, social ontology, and intentional ontology.

* * * * *